United States Patent [19]                [11]  4,252,365
Ferguson                                    [45]  Feb. 24, 1981

[54] RELEASABLE ATTACHMENT CONSTRUCTION FOR DEMOUNTABLE AUTOMOBILE TOPS

[75] Inventor: Alan C. Ferguson, Los Angeles, Calif.
[73] Assignee: Ragtime Mini, Inc., Los Angeles, Calif.
[21] Appl. No.: 48,511
[22] Filed: Jun. 14, 1979
[51] Int. Cl.³ .............................................. B60J 7/18
[52] U.S. Cl. ....................................... 296/216; 49/465; 52/222
[58] Field of Search .............. 296/137 B; 52/222, 273; 49/465, 486, 485, 487

[56]               References Cited
           U.S. PATENT DOCUMENTS

| | | | |
|---|---|---|---|
| 3,974,753 | 8/1976 | Blomgren | 296/137 B |
| 4,067,605 | 1/1978 | Green et al. | 296/137 B |
| 4,127,302 | 11/1978 | Green | 296/137 B |
| 4,183,576 | 1/1980 | Frymire | 296/137 B |
| 4,193,628 | 3/1980 | Sorensen | 296/137 B |

*Primary Examiner*—Robert R. Song
*Attorney, Agent, or Firm*—H. Gibner Lehmann; K. Gibner Lehmann

[57]               ABSTRACT

A releasable attachment construction for automobiles, for releasably securing sheet material of solid or convertible tops to the forward top portion of an automobile body. The attachment construction comprises an elongate anchorage strip having a longitudinal groove, and elongate fastener strips which are interlockingly receivable in the groove and have abutment surfaces adapted to engage one wall of the groove. The fastener strips have surfaces to which the sheet material of the various tops can be attached, as by stitching, screws or other suitable fastening means. The anchorage strip has a projection means adjacent a groove wall, adapted to engage any of the fastener strips in a manner to normally hold them captive when they experience transverse force from the sheet material of the tops. The tendency for the fastener strips to pivot is counteracted by the said projection means, but when the force from the sheet material is lessened, the respective fastener strips can be slipped out of the groove to release the top.

18 Claims, 6 Drawing Figures

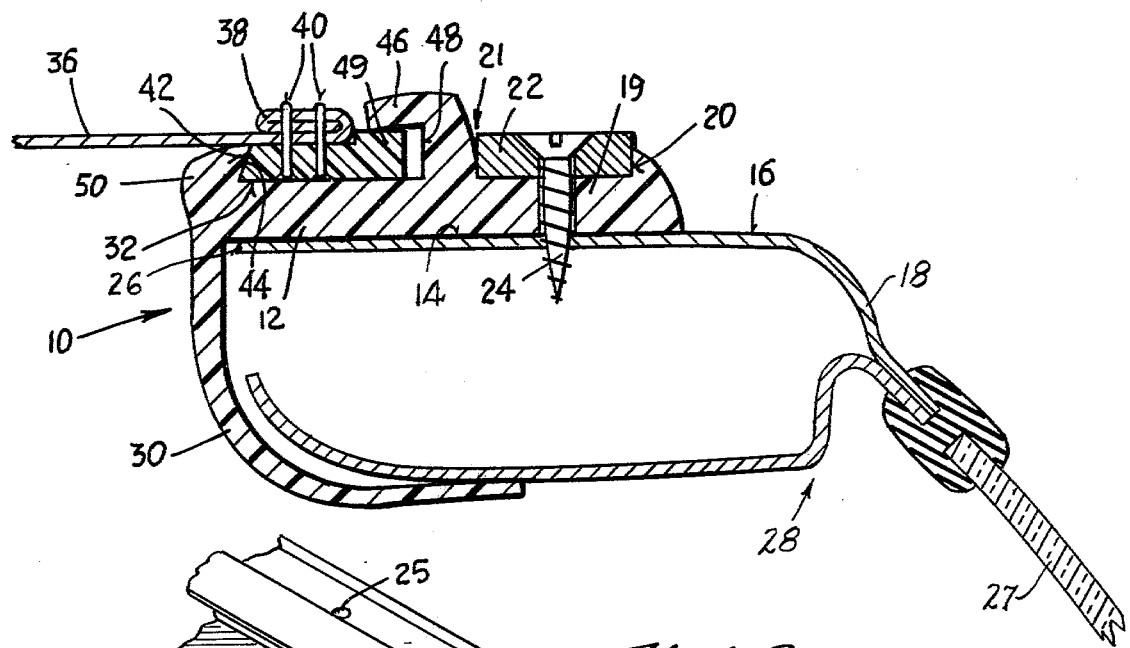

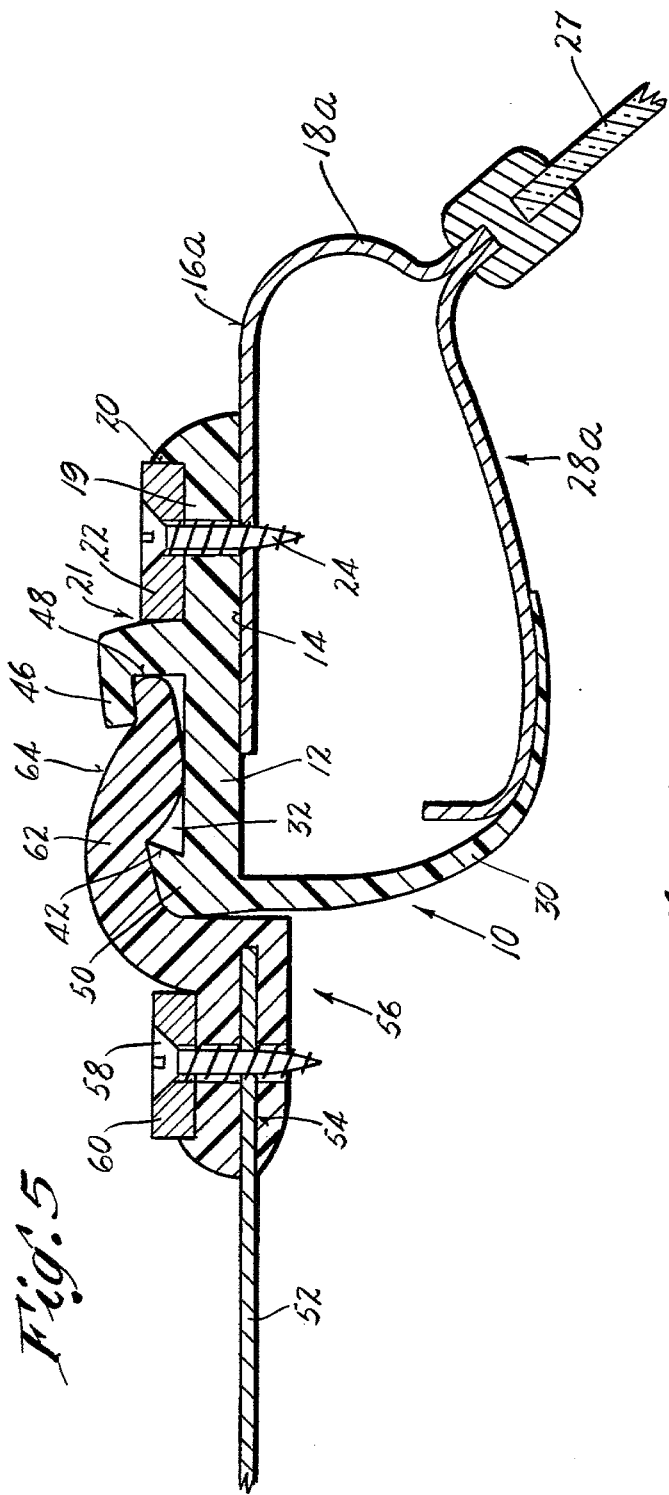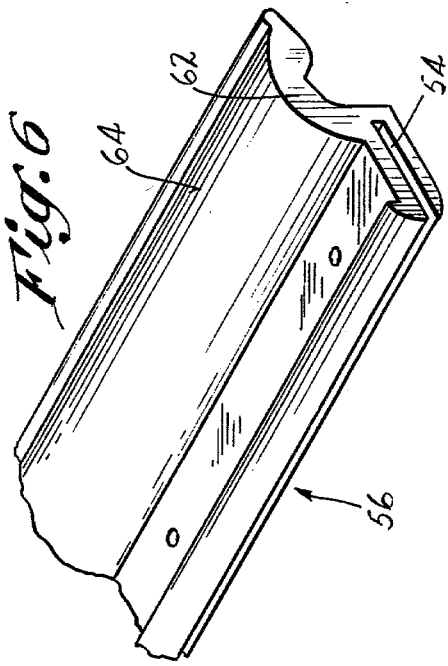

RELEASABLE ATTACHMENT CONSTRUCTION FOR DEMOUNTABLE AUTOMOBILE TOPS

BACKGROUND

This invention relates generally to automobile top constructions, and more particularly to a releasable or demountable attachment construction for detachably securing the sheet material of automobile tops to the top portion of an automobile body.

In the past a number of different arrangements have been proposed and produced for releasably securing, for example, a convertible top to an automobile body. Conventional convertible top constructions typically employ cooperable seal strips, one of which was permanently secured to the automobile body while the other was mounted at the edge of the sheet of convertible top material. The two strips were adapted for mutual abutting engagement, being held in place by multiple clamps which had manually-operable levers carried by and concealed beneath the forward edge of the convertible top.

While many of such constructions operated in a generally satisfactory manner, problems were found to occur, especially after a prolonged period of operation. Where the seal strips were under continual tension, there was a pronounced tendency for one or both members to become warped and undergo aging deformation. When this occurred, the engagement of the two strips did not constitute a tight seal, this giving rise to water leakage and also air leakage. The latter frequently resulted in annoying drafts inside the vehicle, as well as creating objectionable "wind noise" resulting from air rushing past the leakage points between the strips. In addition, very often the clamps associated with such prior convertible tops were difficult or awkward to operate, and were prone to breakage or malfunction, such conditions sometimes rendering the convertible top unusable since it would fly backward suddenly as the vehicle was being driven.

In addition, such arrangements were found to be costly to manufacture and produce. In spite of the high manufacturing costs, the performance and ease of operation of these prior arrangements frequently left something to be desired.

Still other convertible top arrangements employed canvas tops having at their peripheries a multiplicity of snap-type fasteners which could be releasably secured to cooperable fasteners on the automobile body. This has been used in the past in the class of vehicle known as "rugged-terrain". While the installation or removal of the tops was a fairly routine matter, the seal provided between the canvas top and the vehicle body was usually not especially good, resulting again in both leakage of water and air, and undesirable "wind noise".

Additionally, prior convertible tops were especially susceptible to leakage resulting from wind-driven rain or snow under certain circumstances, as when the vehicle is being driven directly into a head wind. The velocity of air travelling past the car can be as high as 90–100 miles per hour or more, depending on the speed of the vehicle and the velocity of the wind. Optimally, convertible top constructions are designed to withstand the stresses imposed by such high winds, with freedom from tearing and minimal likelihood of permitting undesirable air and water leakage, but in many cases these objectives have not been attained.

Generally, no prior devices to my knowledge were produced or were available to enable the interchanging of tops, as for example, from a convertible top to a solid or rigid top and vice versa. That is, there was lacking any kind of attachment construction which would be adaptable for use with demountable automobile tops, whether these were of the convertible foldable type or else of the rigid, non-folding type.

SUMMARY

The above deficiencies in the prior art, the drawbacks and disadvantages of prior attachment arrangements for convertible or demountable automobile tops are obviated by the present invention, which has for one object the provision of a novel and improved releasable attachment construction particularly adaptable for securing a demountable top to the forward top portion of a car body, which construction is especially simple and economical to fabricate while at the same time providing a secure, leak-proof fastening means for the top.

Another object of the invention is to provide an improved releasable attachment construction as above characterized, which is convenient in operation not only to fasten the demountable top material to the body but also to release the same when this is desired.

Still another object of the invention is to provide an improved releasable attachment construction in accordance with the foregoing, which consists of especially few parts that are structurally simple and not likely to malfunction, even over an extended period of use.

Yet another object of the invention is to provide an improved attachment construction of the kind described above, which can be readily adapted for use in conversion operations where a solid-top automobile cab or body is to be changed over into a convertible top, or where convertible and solid automobile tops are intended to be used interchangeably.

A feature of the invention resides in the provision of an improved attachment construction as above set forth, which can be readily adapted to and installed on a forward top portion of the car body after the original car top has been cut away and removed.

Another feature of the invention resides in the provision of an improved attachment means for demountable tops as above defined, wherein rust- and corrosion-resistant parts can be utilized, such as those constituted of plastic substances, without sacrificing strength and structural integrity, and without resulting in malfunction which could cause air and water leaks.

A further feature of the invention resides in the provision of an improved releasable attachment construction for use in converting a solid-top cab to a convertible top or vice versa, wherein an attractive trim or finish is provided, thereby resulting in workmanship which has a professional look or appearance.

Still other features and advantages will hereinafter appear.

In accomplishing the foregoing objects, the invention provides in its essence an elongate anchorage strip having a main body portion and a longitudinal groove therein, such anchorage strip being so constituted that it can be fabricated as a plastic extrusion. The groove in the body portion has elongate, oppositely disposed walls, and the body portion includes a mounting area that is adapted for securement to the forward top portion of the automobile body, as by the use of sheet metal screws. The anchorage strip is flexible and resilient, and readily conforms to the curvature of the automobile body so as to form therewith an effective seal. Cooperable with the anchorage strip is an elongate fastener strip which is arranged for securement to the sheet material of the convertible top, said fastener strip comprising an interlock means which is adapted to be received in the groove of the anchorage strip. The fastener strip has an abutment surface for engagement with one of the walls of said groove, and the anchorage strip has a projection or flange adjacent the other groove wall, which is adapted for engagement with the fastener strip in a manner to inhibit transverse pivotal movement of the fastener strip when the latter is seated in the groove and is being pulled-on by the convertible top. The fastener strip is easily releasable from the groove by an opposite pivotal movement, which is possible when the pull exerted by the convertible top and the resultant force on the abutment surface is lessened. The sheet material of the convertible top can be secured to the fastener sheet by any suitable means, such as by screws, stitching or the like. The anchorage strip is arranged to be clamped between an elongate attachment strip and the car roof, utilizing sheet metal screws as the draft means. All of the strips of the construction are capable of bending, to enable them to conform to the curved contours of the car roof.

In the accompanying drawings:

FIG. 1 is a transverse, vertical sectional view through the releasable attachment construction of the invention, applied to an automobile cab top which has been converted from a solid to a convertible top.

FIG. 2 is a fragmentary perspective view of the elongate anchorage strip as provided by the invention.

FIG. 3 is a fragmentary perspective view of the attachment strip for use with the anchorage strip of FIG. 2.

FIG. 4 is a fragmentary perspective view of a fastener strip adapted for use with the anchorage strip of FIG. 2.

FIG. 5 is a transverse vertical sectional view through the releasable attachment construction of the invention, applied to an automobile cab top wherein the demountable section is of solid or rigid structure, and FIG. 6 is a fragmentary perspective view of the elongate anchorage strip as provided by the invention for the construction of FIG. 5.

As shown, the present attachment construction comprises an elongate anchorage strip 10 which may be fabricated as a plastic extrusion. The anchorage strip 10 is of generally U-shaped cross section, having a body portion 12 which is essentially flat, and having an undersurface 14 adapted for engagement with the top surface 16 of an automobile cab roof 18. The body portion 12 has a fastener means 19 provided with a shallow, relatively wide groove 20 which is located in an elongate area 21 and accommodates an elongate attachment strip 22. The strip 22 has apertures 23 to receive sheet metal screws 24 which pass through corresponding aligned apertures 25 in the fastener means 19 and through the car top 18, for the purpose of securing the anchorage strip to the car.

Where the present attachment construction is to be used in a conversion job, to change from a solid cab top to a convertible cab top, the cab roof 18 is cut along a line which is a short distance to the rear of the car windshield 27, forming an edge 26 which extends parallel to the windshield from one side of the cab to the other. The existing cab ceiling construction which underlies the roof 18 is indicated generally by the numeral 28, and can have various forms which are not involved, per se, with the present invention.

In accordance with the present invention, the anchorage strip 10 is provided with a downward and forward extending arcuate trim portion or skirt 30 which curls toward the front of the vehicle and constitutes an enclosure that presents a continuous, coextensive trim surface that conceals the ragged edge 26 of the car roof 18, as well as enclosing any existing roof or ceiling construction such as that designated in FIG. 1 by the numeral 28. The skirt 30 and the body portion 12 can be considered to be leg portions of the extruded strip, with the connection portion constituting a yoke portion thereof.

The improved attachment construction of the invention further comprises a shallow and relatively wide, longitudinal groove 32 in the upper surface of the body portion 12 to the rear of the fastener means 19, the groove 32 being adapted to loosely receive an elongate flexible fastener strip 34. The sheet material 36 of the convertible top is shown as having a folded back seam 38 of multiple thicknesses, which is attached to the fastener strip 34 by stitches 40. The fastener strip 34, in this instance, can be of suitable plastic material that is adapted to receive the stitches 40.

The rearmost wall 42 of the groove 32 is arranged for abutting engagement with a longitudinal abutment edge or surface 44 of the fastener strip 34, and the body portion 12 of the anchorage strip has an elongate projection or flange 46 adjacent the other wall 48 of the groove 32, said projection being adapted to overlie the forward locking edge portion 49 of the fastener strip 34. The strip 34 can optionally have a flat bead 51 for engagement with the undersurface of the flange 46, as shown in FIG. 1, the bead providing additional strength and stiffness to the strip and also serving as a guide against which the folded edge of the material 36 can be positioned, during the stitching operation that secures the material to the strip.

It will now be seen that, by such arrangement, pulling or tensile forces exerted by the sheet material 36 of the convertible top on the fastener strip 34 will cause an increased force between the rearmost edge 44 thereof and the rear wall 42 of the groove 32. The pull of the sheet 36 will tend to cause counterclockwise transverse pivotal movement of the fastener strip 34, and such movement will be prevented by the interlocking engagement of the strip with the projection or flange 46 of the anchorage strip 10. The stronger the pull exerted on the fastener strip, the more securely will it be held by the projection 46.

Preferably the rear wall 42 of the groove 32 is povided with an undercut configuration, and the wall 44 of the fastener strip is made to conform thereto whereby a more secure interlock is had.

The fastener strip 34 is somewhat less wide than the width of the shallow groove 32 whereby the strip is accommodated loosely in the groove. When it is desired to release the convertible top sheet material 36 from the cab roof 18, it is merely necessary to lessen the tensile force in the sheet material so as to permit the fastener strip 34 to be shifted forward in the groove 32. This will cause disengagement between the walls 42 and 44 of the groove and strip, and enable the latter to be slipped out of the groove by a partial clockwise, pivotal turning of the strip. The disengagement can also be facilitated by applying pressure to the seam 38 of the convertible sheet material, to force the seam forwardly or toward the front of the vehicle. This will take up the looseness in the groove 32 and enable the said disengagement of the walls 42 and 44 to occur.

It will now be readily understood that the fastener strip 34 in conjunction with the flange or projection 46 constitutes an interlock arrangement which will securely fasten the sheet material 36 of the convertible top to the cab roof 18 and yet enable easy detachment of the same when this should be desired. The interlocking arrangement also provides an effective air and water seal, particularly since the sheet 36 of the convertible top forcibly engages a top sealing surface 50 of the body portion 12 of the anchorage strip.

Due to the fact that the flange 46 projects in a rearward direction, extending past the forward locking edge portion of the fastener strip, the likelihood of wind-driven water being blown or forced between the anchorage and fastener strips is greatly minimized or eliminated. The flange 46 thus constitutes a windshield.

Another embodiment of the invention is illustrated in FIGS. 5 and 6, wherein the attachment construction demountably secures a structurally rigid cab top to the front portion 16a, 18a, 28a of the automobile body. Components similar to those already described above have been given like characters. As seen in FIGS. 5 and 6, the rigid cab top is designated 52 and is secured in a slot 54 of a fastener strip 56, as by means of sheet metal screws 58 which pass through a clamp strip 60 and into the top member 52. The sheet metal screws 58 pass through the walls of the fastener strip 56 as shown, and in conjunction with the clamp strip 60 constitute a secure attachment for mounting the fastener strip 56 on the cab top 52.

The fastener strip 56 has a curved flange portion 62 which is adapted to be received in the groove 32 with a pivotal motion, somewhat similar to that involved with the insertion of the fastener strip 49. The strip 56 has an upper surface 64 that is engageable with the flange 46 of the anchorage strip, spreading the flange slightly from the body portion 12 and providing for a tight and effective water and air seal. At the same time, as viewed in FIG. 5, the fastener strip 56 is securely anchored to the anchorage member 10 against dislodgment therefrom while in the operative position in FIG. 5. Somewhat of a cantilever action is involved, which effects a securement of the fastener strip to the anchorage member, and release of the strip is effected by swinging it clockwise as viewed in FIG. 5 while applying a removing force.

It will be seen from the foregoing that I have provided a unique, especially simple and fool-proof releasable attachment construction which is especially adaptable for use with automobile demountable tops, to facilitate the securement of the top sheet material to the cab roof at the points adjacent the windshield of the car and to the rear thereof.

The attachment construction involves simple strip members which can be readily fabricated, the member 10 being readily produced by plastic extrusion. Not only does the construction provide a quick fastening and release means, but it also produces an effective seal and provides a pleasing trim, giving a professional appearance by virtue of the shape of the extrusion, including the depending, forwardly curled skirt 30.

Variations and modifications are possible without departing from the spirit of the invention.

I claim:

1. A releasable attachment construction for detachably securing the sheet of a demountable top to a forward top portion of an automobile body, comprising in combination:
    (a) an elongate anchorage strip having a body portion and a longitudinal groove in said body portion,
    (b) said groove having elongate, oppositely-disposed walls,
    (c) said body portion of the anchorage strip being adapted for securement to said forward top portion of the automobile body,
    (d) an elongate fastener strip arranged for securement to said demountable top sheet, said fastener strip constituting an interlock means adapted to be received in said groove and having a forward, locking edge portion and, spaced therefrom, a rearward abutment edge for engagement with one of the walls of the groove,
    (e) means defining a projection disposed on the body portion of the anchorage strip adjacent the other of said walls of the groove, for engagement with said fastener strip at a point spaced from the abutment edge thereof, to inhibit transverse pivotal movement of the fastener strip when the latter is seated in said groove and is being pulled-on by the demountable top sheet in a transverse direction which increases the force on said abutment edge,
    (f) said fastener strip being releasable from the groove by an opposite pivotal movement when the pull by the demountable top sheet and the force on the abutment edge is lessened.

2. The invention as defined in claim 1, wherein:
    (a) the said one wall of the groove of the anchorage strip is undercut,
    (b) said fastener strip abutment edge being adapted to be received in said undercut.

3. The invention as defined in claim 1, wherein:
    (a) the said projection-defining means comprises an elongate flange which is integral with the body portion of the anchorage strip,
    (b) said flange extending partially over the groove of the anchorage strip and being adapted for engagement with the forward locking edge portion of the fastener strip.

4. The invention as defined in claim 1, wherein:
    (a) the width of the fastener strip is slightly less than the width of said groove whereby the strip can be slid into the groove past the said projection-defining means, and also removed from the groove past said means.

5. The invention as defined in claim 1, wherein:
    (a) the force exerted by the sheet material of the demountable top effects a tight, sealing engagement between the abutment edge of the fastener strip and the engaged wall of the groove in the anchorage strip.

6. The invention as defined in claim 3, wherein:
    (a) the tensile force in the sheet material of the demountable top effects a tight sealing engagement of the forward locking edge portion of the fastener strip with the said projection-defining means of the anchorage strip.

7. The invention as defined in claim 3, wherein:
    (a) the fastener strip has a longitudinal bead adapted for engagement with the undersurface of the said flange of the anchorage strip, said bead providing additional stiffness to the fastener strip.

8. The invention as defined in claim 1, and further including:

(a) a convertible top comprising flexible, water impervious sheet material, and
(b) means for permanently securing said sheet material to said fastener strip, to effect a leak-resistant connection thereto.

9. The invention as defined in claim 8, wherein:
(a) said permanent means comprises a row of stitches extending through said sheet material adjacent an edge thereof,
(b) said stitches also extending through the said fastener strip.

10. The invention as defined in claim 7, wherein:
(a) said bead of the fastener strip constitutes a guide adapted to engage the flexible water impervious sheet material to position the same during the securement of such material to the fastener strip.

11. The invention as defined in claim 1, wherein:
(a) the body portion of the said anchorage strip has fastener means comprising an elongate area provided with multiple apertures to receive screws, by which the anchorage strip can be permanently secured to the automobile roof.

12. The invention as defined in claim 11, wherein:
(a) said elongate area of the body portion of the anchorage strip has a longitudinal clamp groove,
(b) an attachment strip received in said clamp groove, having apertures in alignment with the apertures in the said elongate area, and
(c) multiple screws extending through the aligned apertures in said elongate area and the attachment strip, for securing the anchorage strip to the automobile roof.

13. The invention as defined in claim 11, wherein:
(a) said fastener means is integral with the body portion of the anchor strip.

14. The invention as defined in claim 13, wherein:
(a) said fastener means and said longitudinal groove are located on opposite sides of said projection-defining means.

15. The invention as defined in claim 3, wherein:
(a) said flange projects rearward to the forward locking edge portion of the fastener strip so as to constitute a wind shield and reduce the likelihood of wind-driven water being blown between the anchorage and fastener strips.

16. The invention as defined in claim 1, wherein:
(a) said anchorage strip has a trim portion of generally arcuate cross section which is integral with the remainder of the anchorage strip and is adapted to conceal that edge of the automobile roof which has been cut through, thereby providing a neat, finished appearance to the assemblage of roof and anchorage strip.

17. The invention as defined in claim 1, and further including:
(a) a convertible top comprising a sheet of flexible, water-impervious material,
(b) one edge of said sheet being folded back upon itself to provide additional thickness, and
(c) securing means extending through said thickness, for permanently attaching said sheet to the fastener strip.

18. A combination attachment, seal and trim strip construction for automobiles, to releasably secure a demountable top to the forward portion of a car roof, said strip construction comprising an elongate, extruded, resilient plastic anchorage strip having roughly a U-shaped cross section constituted of two leg portions joined to each other by a yoke portion, said plastic anchorage strip being adapted for securement to the forward portion of a car roof, and a leg portion of said anchorage strip having a wide and shallow, exterior groove for receiving a cooperable elongate fastener strip carried by the demountable top, said exterior groove having opposite longitudinal walls at least one of which is undercut and re-entrant to engage and hold captive one longitudinal edge of said fastener strip, the other of said leg portions and said yoke portion of the anchorage strip presenting at their exteriors a continuous, coextensive trim surface providing a closed, finished appearance at the rear of said forward portion of the car roof, and said anchorage strip having on its said one leg portion a fastener means for engagement with and securement to said forward portion of the car roof.

* * * * *